(12) United States Patent
Kurian et al.

(10) Patent No.: US 12,537,825 B2
(45) Date of Patent: Jan. 27, 2026

(54) SECURING INTERACTIVE RESPONSE SYSTEMS FROM INFILTRATION OF ARTIFICIAL INTELLIGENCE PROGRAMS

(71) Applicant: Bank of America Corporation, Charlotte, NC (US)

(72) Inventors: Manu Kurian, Dallas, TX (US); Ana Maxim, Arlington, VA (US); Michael Young, Davidson, NC (US); Vinesh Patel, London (GB)

(73) Assignee: Bank of America Corporation, Charlotte, NC (US)

( * ) Notice: Subject to any disclaimer, the term of this patent is extended or adjusted under 35 U.S.C. 154(b) by 240 days.

(21) Appl. No.: 18/222,557

(22) Filed: Jul. 17, 2023

(65) Prior Publication Data

US 2025/0030701 A1     Jan. 23, 2025

(51) Int. Cl.
*H04L 9/00* (2022.01)
*G06N 3/006* (2023.01)
*H04L 9/40* (2022.01)

(52) U.S. Cl.
CPC ............ *H04L 63/12* (2013.01); *G06N 3/006* (2013.01); *H04L 63/102* (2013.01); *H04L 63/105* (2013.01)

(58) Field of Classification Search
CPC ..... H04L 63/12; H04L 63/102; H04L 63/105; G06N 3/006
See application file for complete search history.

(56) References Cited

U.S. PATENT DOCUMENTS

| | | | |
|---|---|---|---|
| 2018/0357309 A1* | 12/2018 | Eidem | H04L 67/141 |
| 2021/0119945 A1* | 4/2021 | Sohum | G06N 5/01 |
| 2022/0058347 A1* | 2/2022 | Singaraju | H04L 51/02 |

OTHER PUBLICATIONS

IEEE Dictionary—P (Year: 1998).*

* cited by examiner

*Primary Examiner* — Syed M Ahsan
(74) *Attorney, Agent, or Firm* — Weiss & Arons LLP

(57) ABSTRACT

A method for securing communications received at an automated chatbot within an entity network is provided. The method may enable securing the communications by monitoring inputs received at the automated chatbot in order to identify whether there may be a probability that the input is generated by an artificial intelligence ("AI") program. The method may include receiving a request to initiate a chat session at the automated chatbot. Each input received at the automated chatbot may be simultaneously retrieved by a processor associated with the chatbot for verifying. Each input may be analyzed by an AI auditor application in comparison to trained data stored in an AI model. The trained data may include characteristics that may be associated with input generated by the AI program. When any inputs correspond to the trained data, the AI auditor may pause the chat session at the automated chatbot and/or terminate the chat session.

12 Claims, 7 Drawing Sheets

SECURING INTERACTIVE RESPONSE SYSTEMS FROM INFILTRATION OF ARTIFICIAL INTELLIGENCE PROGRAMS

FIELD OF TECHNOLOGY

Aspects of the disclosure relate to securing communications within interactive response systems.

BACKGROUND OF THE DISCLOSURE

Artificial intelligence ("AI") systems with natural language processing ("NLP") software in use today may be capable of replicating a human response. AI systems may also be equipped with voice cloning software or deep fake software. AI systems may be able to replicate what a human sounds like, looks like and things the human may say. Such AI systems raise security concerns.

Humans may interact differently with others based on a number of factors. Factors may include the relationship between the human and others, the setting and the subject of the interaction. Such interactions may be public interactions, private interactions or professional interactions.

AI systems may only replicate what they can learn. Data available to AI systems may be limited to publicly available data. AI systems may not be able to replicate the human during a private or professional interaction.

AI systems may replicate a user when interacting with an interactive response system. The AI system may attempt to imitate the user's text and/or voice to initiate and run a chat session. When not detected, the AI system may capture secure data of a user.

Therefore, it would be desirable to improve interactive response systems to recognize distinct human interactions and distinct AI interactions and to distinguish between human and AI interactions.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
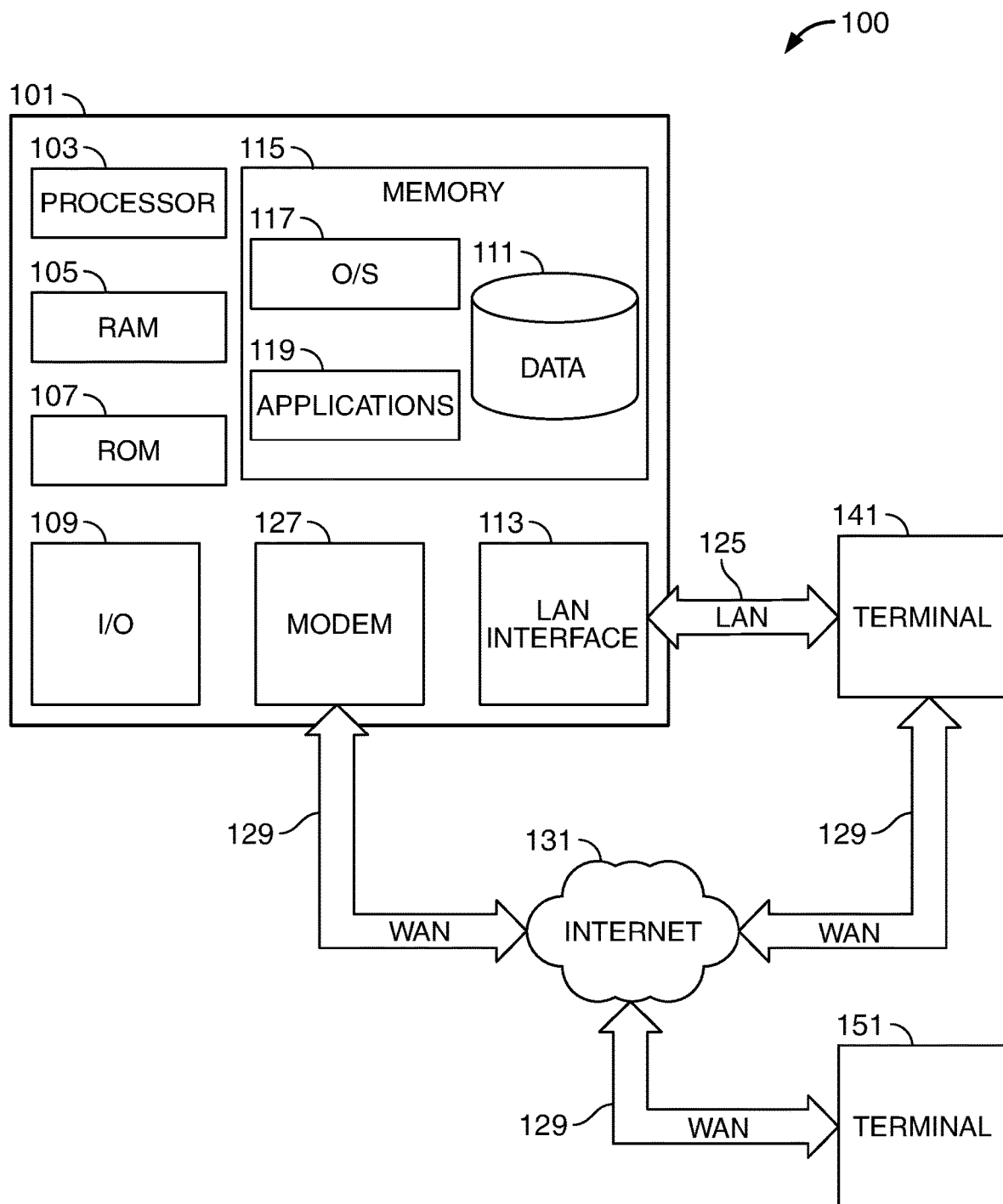
FIG. 1 shows an illustrative block diagram in accordance with principles of the disclosure.

An interactive response system for securing communications received at an automated chatbot within an entity network is provided. The securing may include monitoring inputs received at the automated chatbot to identify input generated by an artificial intelligence ("AI") program. The AI program may be a software bot, i.e.—a spambot.

The interactive response system may be running within the entity network. The interactive response system may be running outside the entity network. The interactive response system may be leveraged by each sub-group within an entity associated with the entity network.

The automated chatbot may be voice-based. The automated chatbot may be text-based. The automated chatbot may be running within the entity network. Customers associated with the entity may be logged in to a personal account or a business account in order to be able to use the automated chatbot.

In some embodiments a user may log in to the user's account and perform methods for authenticating the user's login credentials. The user, in some embodiments, may be a fraudulent user and an AI robot may be attempting to take over the user's account. The AI robot may be run by the AI program. The AI robot may gain access to the customer's online account and initiate a chat session. The chat session may enable the AI robot access to secure data and perform transactions.

The automated chatbot may monitor the incoming chats to further verify the user as the actual user of the account that is being accessed. When one or more data points are identified that do not correspond to the user's profile, the automated chatbot may pause the chat session for further investigation.

The interactive response system may include an AI model. The AI model may be configured for storing training data of characteristics associated with input generated by the AI program. Input generated by an AI program may be distinguished by a plurality of distinctions. Speed, syntax, use of linguistics, expressions and any other suitable characteristic may be leveraged to identify whether the input is generated by the AI program or a human user associated with the account.

An AI model may include a processing unit. The processing unit may provide power to the AI model. The processing unit may be a graphical processing unit ("GPU"). The processing unit may be a central processing unit ("CPU"). The power may be needed in order for the AI model to perform processing and computing functions.

The AI model may receive data. The AI model may receive large amounts of data. The data may be received from different sources. The data may be received from entity specific sources. The data may be received from public sources. The data may be received from private sources. Data that is received from public sources may include information that can be shared, used, reused and redistributed without restriction. Data that is received from private sources may include any personal, personally identifiable, financial, sensitive or regulated information of a specific person or entity.

The AI model may learn from experience via iterative processing and algorithmic training. The AI model may include progressive learning algorithms. The progressive learning algorithms may ingest the data. The progressive learning algorithms may be programmed to analyze the ingested data. The progressive learning algorithms may analyze the data for correlations and patterns within the data. The progressive learning algorithms may use the analyzed correlations and patterns to make predictions. The AI model may update the progressive learning algorithm based on the predictions curated from the analyzed correlations and patterns. The data may be used to dynamically program the AI model.

The AI model may test and measure its performance. By providing the AI model with labeled training and testing datasets, the AI model can measure its performance against the labeled training and testing datasets. Based on measuring its performance, the AI model can update its algorithm to be able to provide a more accurate performance. The AI model can increase its capabilities by using training and testing datasets. The training of the AI model can be dynamically updated using testing and training sets.

The AI model may include machine learning algorithms. The AI model may include deep learning algorithms. Deep learning algorithms may include neural networks. Neural networks may use interconnected nodes or neurons in a layered structure to analyze data and predict outcomes. The AI model may include natural language processing ("NLP"). NLP may allow for AI models to recognize, analyze, interpret, and understand human language, either written or spoken. The AI model may include any other suitable algorithms or components.

The AI model may be configured for storing these characteristics. The AI model may be configured for continuously learning from inputs received and updating the characteristics for future inputs received.

The AI model may include a plurality of response times. The response times may include lapses of time between an output from the automated chatbot time and receiving a corresponding response from the AI program.

An AI program may be enabled to submit a response to an automated chatbot at a speed greater than a human response. An AI program may be enabled to submit a response up to at least ten times faster than a human response.

The plurality of response times included in the AI model may include a range of possible response times it may take for the AI program to respond that may be distinguished from the response time it may take a human user to response.

The AI model may also include a plurality of AI utterances. The plurality of AI utterances may include words, groups of words, and consecutive responses associated with the AI program.

The AI model may include a library of utterances that may be distinguishable from a human utterance. Utterances that may be identified as being from an AI program and not from a human may include AI stylistic wording choices, AI specific data and any other suitable AI communication indicators.

The interactive response system may include a database. The database may be configured for storing a customized data profile associated with each user account within the system. Every customer may have a customized data profile. The customer, when setting up an account, may input the data. The system may continuously learn from the actions, behaviors and syntax the customer may use when interacting with the system and store the learned actions, behaviors and syntax within the customized data profile of the customer.

The customized data profile for each user may include a language spoken by the user and syntax the user may use in voice chats and text chats. Syntax may include catch phrases, tones, and enunciations, human emotions, speech patterns, any other suitable user communication indicators. The second dataset may include indicators that the communication is generated by an AI program.

The customized data profile may also include learned behaviors of the user and a security level assigned to the user account. The security level may define private entity data available for access, via the automated chatbot, by a user of the user account.

The automated chatbot may be configured to receive a request to initiate a chat session. It should be appreciated that the chat session may only be initiated following authorization of a user into the user's account.

The automated chatbot may be configured to capture a first input. The automated chatbot may be configured to generate a first automated response based on the first input. The automated chatbot may be configured to capture a first timestamp of a time of the generating of the first automated response.

The automated chatbot may be configured to capture a second input. The automated chatbot may be configured to capture a second timestamp of a time of the capture of the second input.

The automated chatbot may be configured to generate a second automated response based on the second input.

During a duration of time that the automated chatbot is in electronic communication via the chat session, the system may be configured to monitor the chat session to further confirm that the user interacting with the automated chatbot is the user associated with the account and not an AI program.

The interactive response system may include a processor. The processor may be configured to, simultaneous to the chat session, feed the first input, the second input, the first automated response, the second automated response, the first timestamp and the second timestamp, to an AI auditor for analysis.

As each input is being received from the user at the automated chatbot, the input is fed into the processor for the AI auditor to analyze. The AI auditor may analyze the inputs along with the AI model. In some embodiments, the AI auditor may analyze the inputs and the AI model may analyze the inputs. In some embodiments, the AI auditor may leverage training data stored at the AI model for analysis.

The AI auditor may be an application leveraging ML and AI to differentiate between a human user and an AI program. The AI auditor may operate alongside the AI model. The AI auditor may leverage the training data of the AI model for verification.

The AI auditor running on the entity network may be configured to analyze the first input and the second input using the AI model. The analyzing may be for determining whether any utterance within the first input and the second input correspond to one or more of the plurality of AI utterances. The analyzing may include using algorithms for text recognition and algorithms for determining a sentiment and intent in order to identify whether the utterance(s) correspond to an AI utterance within the AI model.

The AI auditor may analyze the first input and the second input to determine whether a time between the first timestamp and the second timestamp corresponds to any one of the response times.

If the time between the automated chatbot outputting a response and the receipt of an input is within the range of any one of the response times stored in the AI model, the processor may determine that the user communicating may be an AI program and may not be a human user. The response times may be pre-determined ranges of time that indicate an AI program.

When the time is equal to or within the pre-determined ranges of time, the AI auditor may be configured to transmit a first instruction to the automated chatbot to terminate the chat session.

When any one of the first input and second input include one of the plurality of AI utterances, the AI auditor may be configured to transmit an instruction to the automated chatbot to terminate the session. In some embodiments, the instruction may be to pause the chat session until further verification of the user.

When the first input or second input do not include the training data stored in the AI model, the AI auditor may be configured to further verify that the chat session is between the automated chatbot and the user associated with the user account and not with an AI program.

The AI auditor may be configured to determine whether any user characteristics extracted from each of the first input and second input correspond to user characteristics of the user stored in the customized data profile associated with the user's account.

When the first input and second input do not correspond to one or more user characteristics, the AI auditor is configured to transmit an instruction to the automated chatbot to terminate the chat session.

When the first input and second input include one or more user characteristics, the AI auditor is configured to transmit an instruction to the automated chatbot to continue the chat session.

When the request included in the first input or second input may be outside the security level assigned to the user's account, the AI auditor may be configured to transmit the instruction to the automated chatbot to terminate the chat session.

It should be appreciated that when the first input or second input do not include training data stored in the AI model, the AI auditor may be configured to, prior to terminating the chat session, transmit a second instruction to the automated chatbot to pause the chat session.

Following the pausing, the AI auditor may be configured to trigger a request for an additional factor of authentication from the user prior to resuming the chat session.

The request for the additional factor of authentication may include one of a captcha, secret question, verification code, OTP or any other suitable factor of authentication.

When a response to the request for the additional factor of authentication is submitted, the AI auditor may be configured to verify authenticity of the response. When the user is an AI program, the AI program may not be enabled to submit the additional factor of authentication. When the additional factor of authentication may not be verified, the AI auditor may instruct the automated chatbot to terminate the session.

When the user is a human user, and the human user is the user associated with the customer account already authorized, the additional factor of authentication may be verified. The AI auditor may be configured to instruct the automated chatbot to resume the chat session.

The first input, the second input, the first automated response and the second automated response may be stored by the AI model, and analyzed, through one or more algorithms, to train the AI model for one or more future inputs.

It should be appreciated that the chat session is not limited to one or two inputs. The chat session may be any suitable amount of inputs and responses that an interactive response system may include. The system may be enabled to continuously monitor each input as its being received at the automated chatbot.

Each chat session may be stored in the AI model for training purposes. The chat sessions that may be determined to be a customer, may be stored along with the customers profile for machine learning ("ML") purposes. The system may continuously be trained with the customers sentiment, expressions, jargon and use of words in a chat session. Each time the user is logged in and initiates a chat session, these stored sessions may be leveraged for comparing and authenticating the user to continue with the chat session. When the sentiment and use of words may not be recognized by the AI model, the automated chatbot may deny continuation of the chat session until further verification.

When the first input or second input do not include training data and the request included in the first input or second input is within the security level assigned to the user account, the automated chatbot may be configured to continue the chat session.

In some embodiments, when the chat session is terminated, the processor may be configured to log the user out of the user's account. The processor may further be configured to deactivate the account until the user resets a user ID and password associated with the user's account. The processor may be configured to transmit an electronic communication to the user's device(s) to initiate a selectable option for resetting the user ID and password.

A method for securing communications received at an automated chatbot may be provided. The automated chatbot may be running on a central server associated with an entity network. The securing may be performed by monitoring inputs received at the automated chatbot to identify input generated by an AI program.

The method may include receiving a request to initiate a chat session at the automated chatbot. The request may be received following authorization of a user's login credentials for access to a user's personal account.

In some embodiments a spambot may be enabled to leverage AI to gain access to a user's account. Therefore, when a chat session is initiated by a 'user' of the account, the method may include further verifying the 'user' is the actual user associated with the account prior to providing personal and/or private data on the automated chatbot.

The method may include capturing a first input. The method may further include generating a first automated response based on the first input. The method may also include capturing a first timestamp of a time of the generating of the first automated response. The method may include capturing a second input. The method may further include capturing a second timestamp of a time of the capture of the second input.

The method may include generating a second automated response based on the second input.

Simultaneous to the chat session, the method may include feeding the first input, the second input, the first automated response, the second automated response, the first timestamp and the second timestamp, to an AI auditor for analyzing.

The AI auditor may use ML, NLP, sentiment analysis and any other suitable algorithms for analyzing the chat session. The AI auditor may leverage a ML model that is pre-trained using historical chat sessions and responses to identify an AI program. The ML model may be continuously trained with each new chat session.

The method may include analyzing the first input and the second input by the AI auditor.

The AI model may store training data of characteristics associated with input generated by the AI program. The training data may include a plurality of response times that may indicate that the input is being inputted by an AI program and not a human user. The response times may be lapses of time between an output from the interactive response time and receiving a corresponding response from the AI program. The response times may be at a significantly greater speed than a response time is possible to be inputted by a human user.

The AI model may also include training data including a plurality of AI utterances. The plurality of AI utterances may include words, groups of words, and consecutive responses associated with the AI program.

The method may include determining, based on the analyzing, whether any utterance within the first input and second input correspond to any one or more AI utterances.

The method may also include determining whether a time between the first timestamp and the second timestamp corresponds to any one of the response times.

In some embodiments, the determining may be based on both the identifying one or more AI utterances and the time being one of the response times. In some embodiments, the determining may be based on either the one or more AI utterances or the time being one of the response times.

When the first input or second input comprise training data stored in the AI model, the method may include transmitting a first instruction to the automated chatbot to terminate the chat session.

When the first input or second input does not include training data, the method may include verifying that the chat session is between the automated chatbot and the user associated with the user account. This may be performed by determining whether the first input and second input include one or more user characteristics.

When the first input and second input do not include one or more user characteristics, the method may include transmitting an instruction from the AI auditor to the automated chatbot to terminate the chat session.

When the first input and second input include one or more user characteristics, the method may include transmitting an instruction from the AI auditor to the automated chatbot to continue the chat session.

Each user associated with the entity may have a customized data profile stored that corresponds to the user account. The customized data profile may be used for comparing stored characteristics to the characteristics identified in each of the inputs received during the chat session.

The customized data profile may include a language spoken by the user. The selection of words in a chat session via text or voice may be unique for each language. Some expressions and words that may be used in a text or voice chat may be identifiable to a specific language. This may enable the AI auditor to identify an AI program during the chat session.

The customized data profile may also include learned behaviors of the user. Learned behaviors may include types of words the user may use and a level of aggressiveness that may be identified by the words or voice the user is using.

The customized data profile may also include a security level assigned to the user account. The security level may define private entity data available for access by a user of the user account via the automated chatbot. Each user may have access to different levels of private data via the chatbot. Some users may be enabled to retrieve private data through the chatbot. Some users may not have access to private data via the chatbot.

The method may further include analyzing a flow of the conversation to identify whether the input includes a repetition of a previous chat within the same conversation. The analyzing of the flow may also be performed to identify one or more social cues that may indicate a probability of the input being inputted by the AI program.

Social cues and syntax may be identified based on historical chat sessions. The method may include identifying based on the historical chat sessions including specific words, expressions, images and/or emojis that the user may continuously use, to verify that the input is via the user and not an AI program.

The AI auditor may be enabled to identify whether the repetition is an exact repetition. The exact repetition when the input is voice-based may be a repetition of the words without a change in the voice level of the input. The exact repetition when the input is text-based may be a repetition of the words without any grammatical change.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein, such as the entity network which may include the interactive response system, the automated chatbot, the AI auditor, the AI model and computing device(s) of the user. The elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include a modem 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks.

Application programs 119 may include the first entity application, the second entity application and the OTP application.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
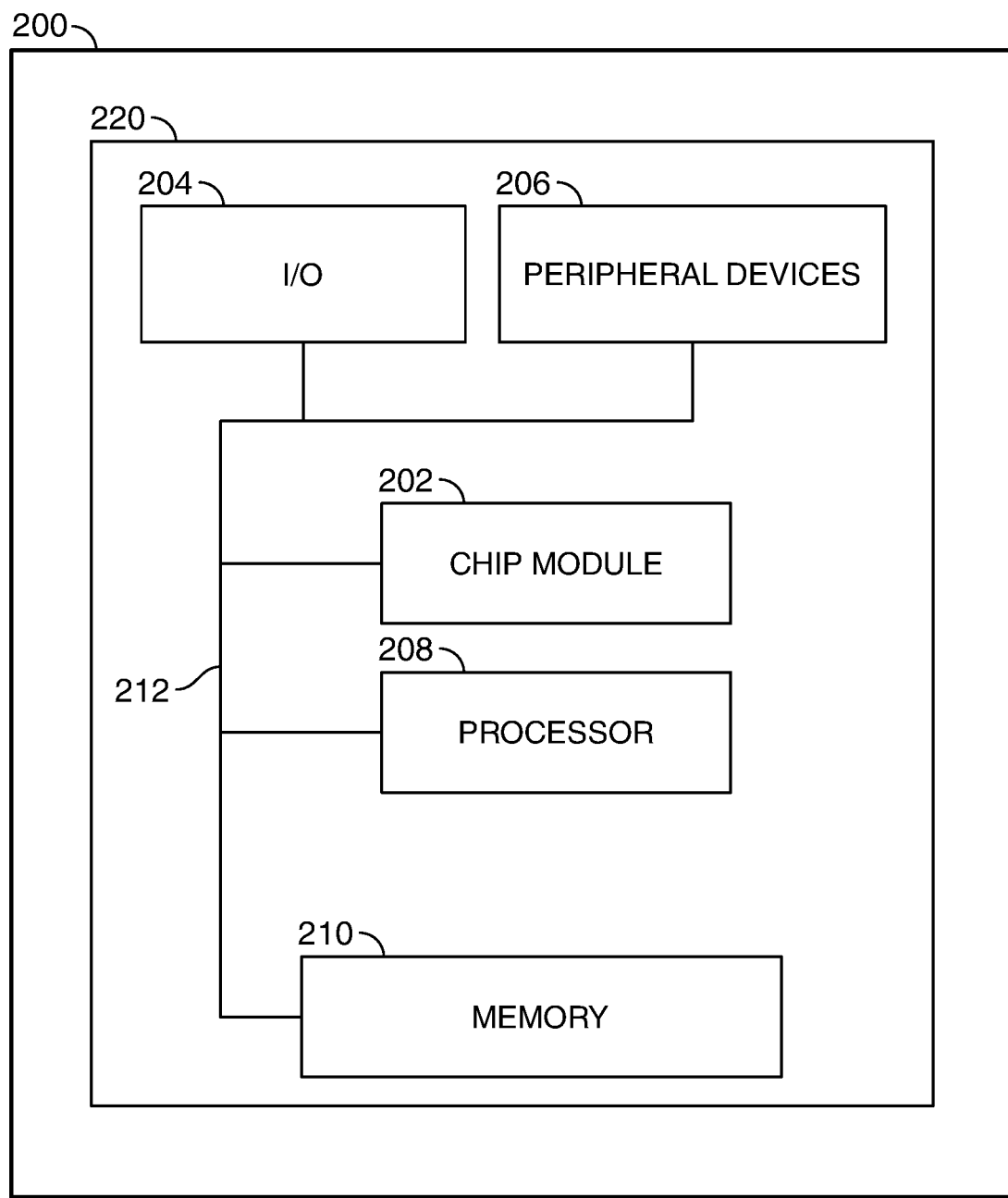
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
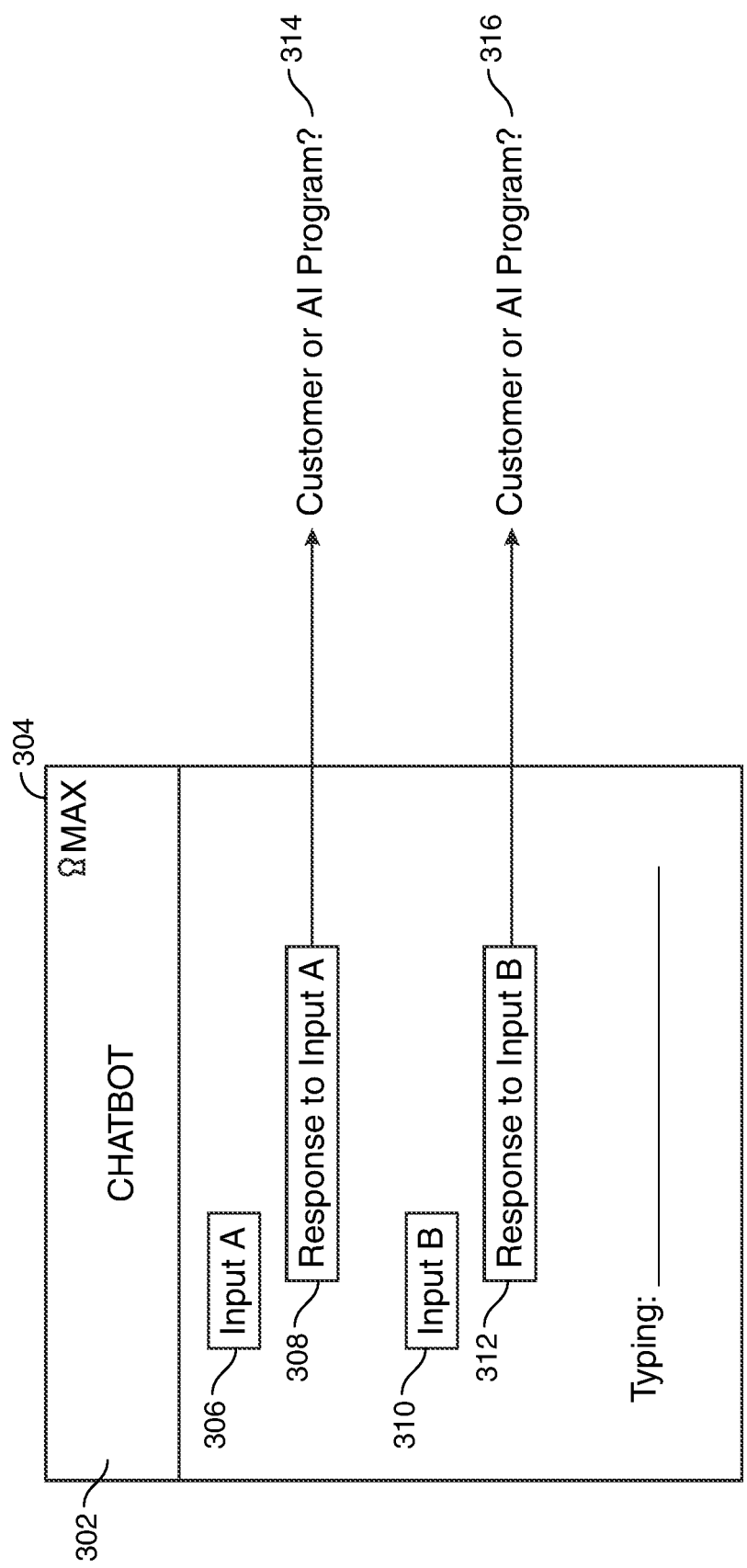
FIG. 3 shows an illustrative diagram in accordance with principles of the disclosure.

FIG. 3 shows an illustrative diagram of a chat session running within an automated chatbot. The automated chatbot 302 may be a chatbot associated with an entity within the entity network. Automated chatbot 302 may be a voice-based chatbot. Automated chatbot 302 may be a text-based chatbot.

In this illustrative diagram, a user 'Max' may be logged into an account associated with the user Max, as shown at 304.

User 304 may initiate a chat session. The chat session may be initiated by a receipt of input A, 306, inputted by user 304. Input 308 may be a response to input A, 306, generated by automated chatbot 302. The chat session may continue with input B, shown at 310. Input 312 may be a response to input B that may be generated by the automated chatbot.

The system may monitor each input to verify that the user 304 is the human user associated with the account and not an AI program that may be attempting to perform malicious activity on the user's account, as shown at 314 and 316.

Figure 4:
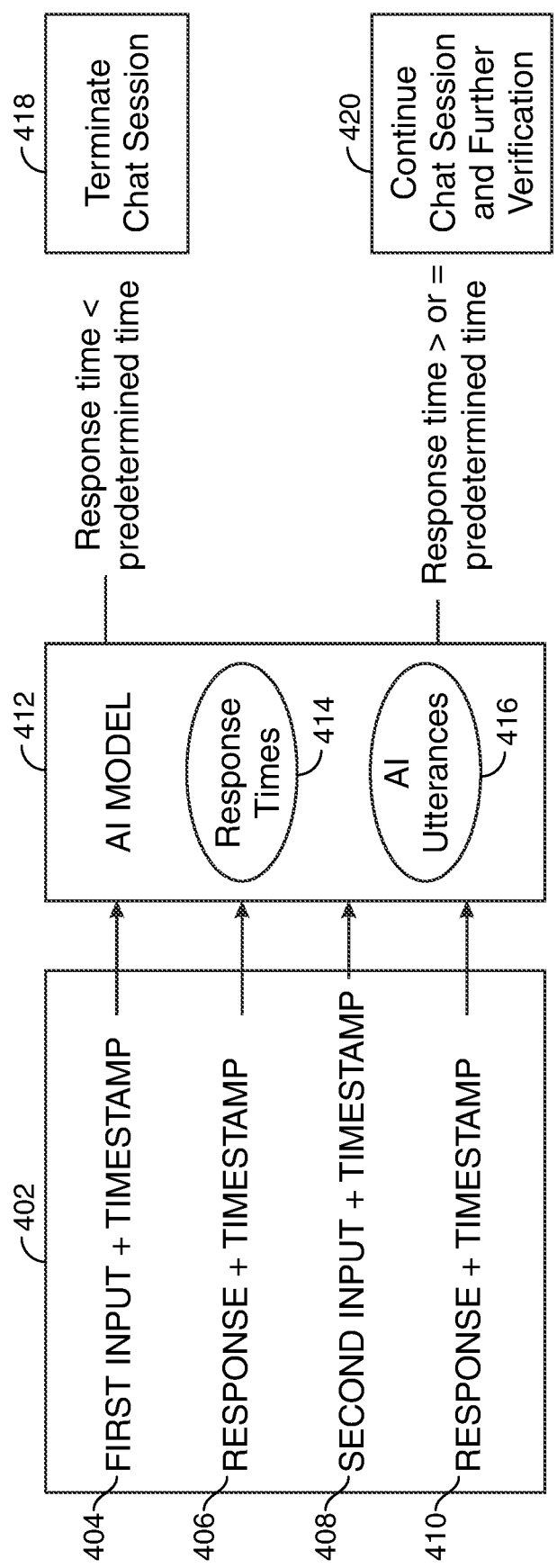
FIG. 4 shows an illustrative diagram in accordance with principles of the disclosure.

FIG. 4 shows an illustrative diagram of an analysis of the interactions within the chat session for identifying a probability of an AI program performing as the user of the account.

The system may capture from the automated chatbot 402 a first input and a timestamp of receipt of the first input, as shown at 404. The system may capture a response generated by the automated chatbot and a timestamp of the response, as shown at 406. The system may capture a second input and a timestamp of receipt of the second input, as shown at 408. The system may also capture a response to the second input and a timestamp of the response, as shown at 410.

Each of 404, 406, 408 and 410 may be fed into the AI model 412 for analysis. AI model 412 may analyze characteristics that may be extracted from each input and response to determine whether they correspond to types of inputs inputted by an AI program.

AI model may store a plurality of response times 414 that may indicate association of an AI program. AI model may store a plurality of AI utterances 416 that may indicate association of an AI program.

The AI model may, using the timestamps received from the automated chatbot 402, determine whether the inputs may be associated with the AI program.

Based on the timestamps, when the response time is less than a pre-determined amount of time, this may be an indication of an AI program initiating the chat session and the system may be configured to terminate the chat session, as shown at 418.

And when the response time is greater than or equal to the pre-determined time, the system may be configured to continue the chat session and perform additional factors of verification, as shown at 420.

Figure 5:
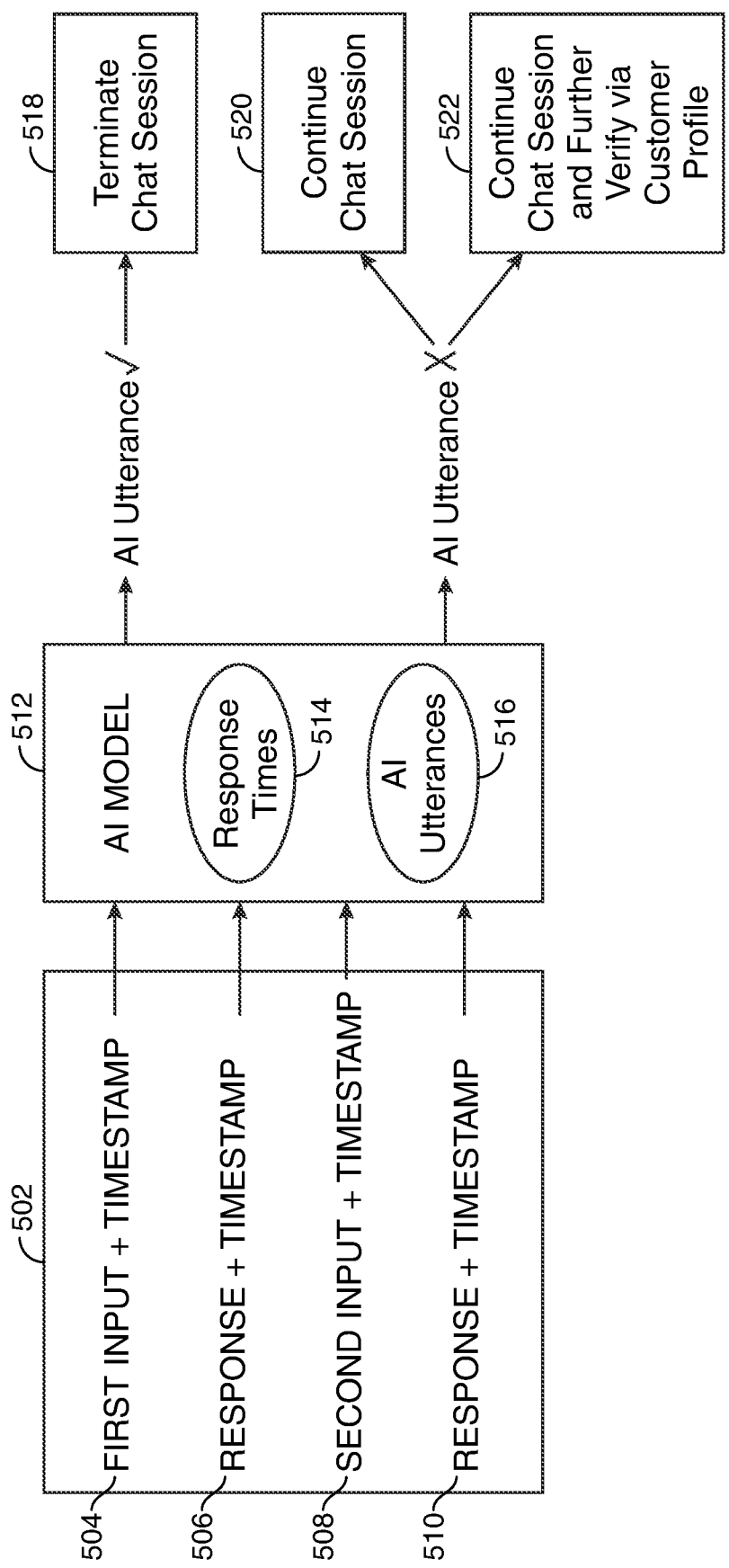
FIG. 5 shows an illustrative diagram in accordance with principles of the disclosure.

FIG. 5 shows an illustrative diagram of an analysis of the interactions within the chat session for identifying a probability of an AI program performing as the user of the account.

The system may capture from the automated chatbot 502 a first input and a timestamp of receipt of the first input, as shown at 504. The system may capture a response generated by the automated chatbot and a timestamp of the response, as shown at 506. The system may capture a second input and a timestamp of receipt of the second input, as shown at 508. The system may also capture a response to the second input and a timestamp of the response, as shown at 510.

Each of 504, 506, 508 and 510 may be fed into the AI model 512 for analysis. AI model 512 may analyze characteristics that may be extracted from each input and response to determine whether they correspond to types of inputs inputted by an AI program.

In this illustrative diagram, AI model 512 may analyze the text/voice of each input to determine if any input, utterance, text, or voice may correspond to one or more AI utterances stored in the AI model.

When AI model 512 identifies one or more inputs that may include any one of the AI utterances 516, the system may be configured to terminate the chat session, as shown at 518.

When the AI model 512 does not identify one or more inputs that may correspond to any one of the AI utterances 516, the system may be configured to continue the chat session without further verification, as shown at 520. In some embodiments, the system may be configured to continue the chat session and further verify the user leveraging an additional factor of authentication, as shown at 522.

Figure 6:
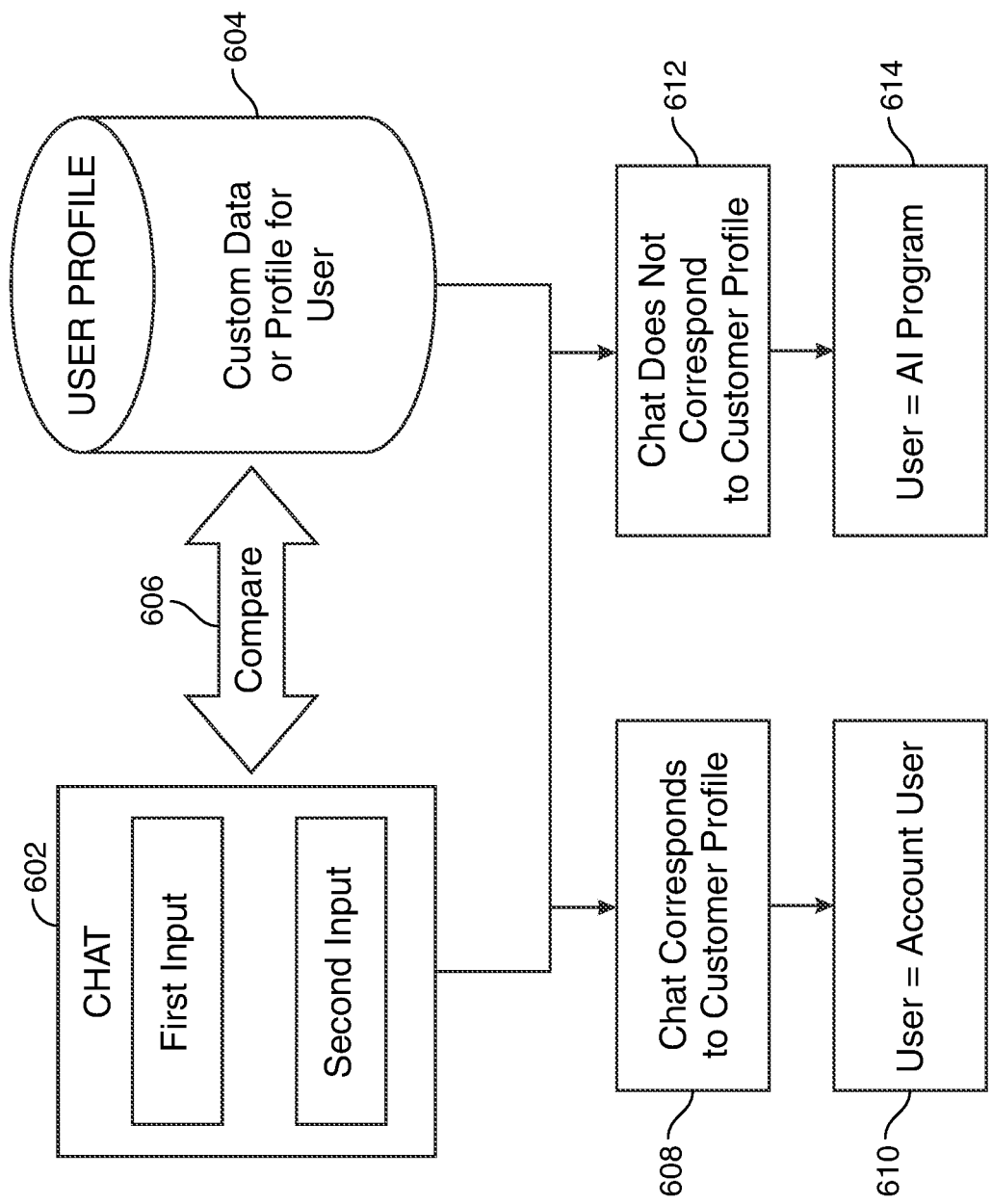
FIG. 6 shows an illustrative flow diagram in accordance with principles of the disclosure.

FIG. 6 shows an illustrative flow diagram in accordance with principles of the disclosure. The flow diagram may display a comparison of the inputs received at an automated chatbot to data stored within the customers personal account profile.

First input and second input within the chatbot 602 may be compared to data stored in the customers data profile, shown at 604. The comparison 606 may be performed using one or more algorithms for extracting and converting the inputs into text, identifying the sentiment and intent of each input and identifying expressions of the inputs to determine whether they correspond to the user's stored data.

At 608, when the chat corresponds to data stored in the customer profile, the system may confirm that the user initiating the chat session may be the user of the account, as shown at 610.

Additionally, when the chat does not correspond to data stored in the customer profile, shown at 612, the system may confirm that the user initiating the chat session may be an AI program as shown at 614.

Figure 7:
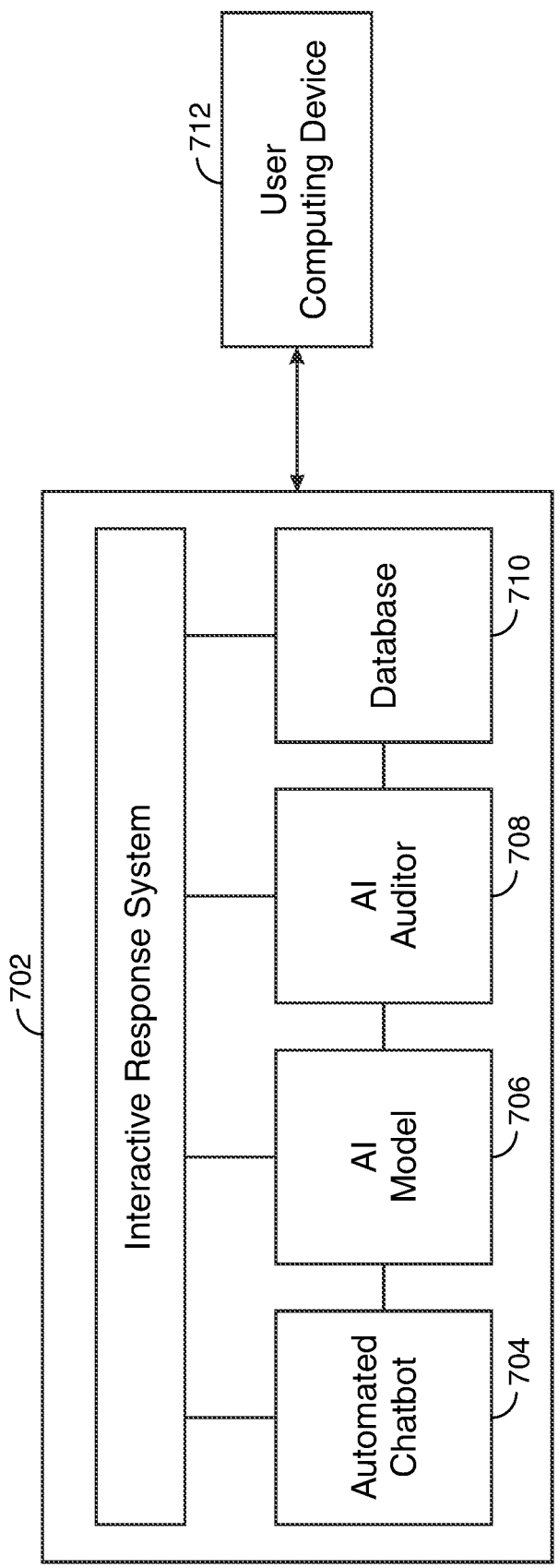
FIG. 7 shows an illustrative diagram in accordance with principles of the disclosure.

FIG. 7 shows an illustrative architecture of an entity network that may include the interactive response system 702. Interactive response system 702 may include the automated chatbot 704. The system 702 may include an AI model 706, the AI auditor 708 and the database 710. Each of 702, 704, 706, 708, 710 and 712 may include one or more features as described in FIGS. 1 and 2.

The user that may be initiating the chat session may be shown at 712. In some embodiments, the user may be the user associated with a personal account within the entity network. In some embodiments, the user may be an AI program imitating the user.

The user computing device 712 may be a laptop, smartphone, mainframe computer, desktop computer, tablet, or any other suitable computing devices.

Thus, systems and methods for securing communications received at an automated chatbot within an entity network is provided. Persons skilled in the art will appreciate that the present invention can be practiced by other than the described embodiments, which are presented for purposes of illustration rather than of limitation.

What is claimed is:

1. A computing device comprising a hardware processor and a hardware memory, wherein the hardware memory is storing an interactive response system running by the hardware processor, wherein the interactive response system comprises an AI model, a database, an automated chatbot and an AI auditor, the interactive response system that is configured for securing communications received at the automated chatbot by identifying chat sessions received from a spambot and terminating chat sessions being inputted by spambots, the system comprising:

the AI model running on the computing device, the computing device comprising a hardware processing unit for providing power to the AI model for performing processing and computing functions, the AI model configured for:
  receiving data input from a plurality of sources, the data input being used as training data to train the AI model, the data input comprising characteristics associated with input generated by the AI program, the training data comprising:
a plurality of response times, the plurality of response times being lapses of time between an output from the automated chatbot and receiving a corresponding response from the AI program; and
a plurality of AI utterances, the AI utterances including words, groups of words, and consecutive responses associated with the AI program; and
storing the data input on the hardware memory for use by the AI auditor for analysis of inputs received at the automated chatbot;
the database residing on the computing device for storing a customized data profile associated with each user and each user's account within the system, the customized data profile for each user comprising user characteristics including:
  a syntax associated with a user;
  learned behaviors of the user; and
  a security level assigned to the user account, the security level defining private entity data available for access, via the automated chatbot, by a user of the user account;
the automated chatbot running on the computing device configured to receive a request to initiate a chat session and, during the chat session:
  capture a first input and generate a first automated response based on the first input;
  capture a first timestamp of a time of the generating of the first automated response;
  capture a second input;
  capture a second timestamp of a time of the capture of the second input; and
  generate a second automated response based on the second input;
the hardware processor configured to, simultaneous to the chat session, feed the first input, the second input, the first automated response, the second automated response, the first timestamp and the second timestamp, to an AI auditor for analysis;
the AI auditor running on the computing device, the AI auditor running machine learning algorithms and AI algorithms to analyze the first input and the second input using the AI model, for determining whether the chat session is being initiated by a human user or the AI program, the AI auditor configured to determine:
whether any utterance within the first input and the second input correspond to one or more of the plurality of AI utterances; and
whether a time between the first timestamp and the second timestamp corresponds to any one of the response times;
when one of the first input and second input comprise training data of at least one of the plurality of AI utterances or the time corresponding to any one of the response times:
the AI auditor is configured to transmit a first instruction to the automated chatbot to terminate the chat session;
the hardware processor is configured to, in response to a terminating of the chat session, log the user out of the user's account;
the hardware processor is configured to, following the logging of the user out of the user's account, deactivate the user's account;
the hardware processor is configured to, following the deactivating, transmit an electronic communication to the user's device to initiate a selectable option for resetting a user ID and password for the user's account; and
the AI auditor is configured to, when the first input or second input do not comprise the training data, verify that the chat session is between the automated chatbot and the user associated with the user account by:
determining whether the first input and the second input correspond to one or more user characteristics;
when the first input and second input do correspond to one or more user characteristics, the AI auditor is configured to transmit an instruction to the automated chatbot to continue the chat session; and
when the first input and second input do not correspond to the one or more user characteristics, the AI auditor is configured to transmit an instruction to the automated chatbot to terminate the chat session.

2. The system of claim 1 wherein the chat session is an authenticated chat session and a user's credentials have been verified.

3. The system of claim 1 wherein when the request included in the first input or second input is outside the security level assigned to the user account, the AI auditor is configured to transmit the instruction to the automated chatbot to terminate the chat session.

4. The system of claim 1 wherein when the first input or second input do not comprise training data, the AI auditor is configured to, prior to terminating the chat session:

transmit a second instruction to the automated chatbot to pause the chat session; and trigger a request for an additional factor of authentication prior to resuming the chat session.

5. The system of claim 4 wherein the request for the additional factor of authentication is one of a captcha, secret question, verification code and OTP.

6. The system of claim 5 wherein a response to the request is submitted, the hardware processor is configured to verify authenticity of the response.

7. The system of claim 6 wherein when the hardware processor authenticates the response, the hardware processor is configured to instruct the automated chatbot to resume the chat session.

8. The system of claim 6 wherein when the request is not authenticated, the hardware processor is configured to instruct the automated chatbot to terminate the chat session.

9. The system of claim 1 wherein the first input, the second input, the first automated response and the second automated response are stored by the AI model, and analyzed, through one or more algorithms, to train the AI model for one or more future inputs.

10. The system of claim 1 wherein the chat session is text-based.

11. The system of claim 1 wherein the chat session is voice-based.

12. The system of claim 1 wherein when the first input or second input do not comprise training data and the request included in the first input or second input is within the security level assigned to the user account, the automated chatbot is configured to continue the chat session.

\* \* \* \* \*